Figure 1:
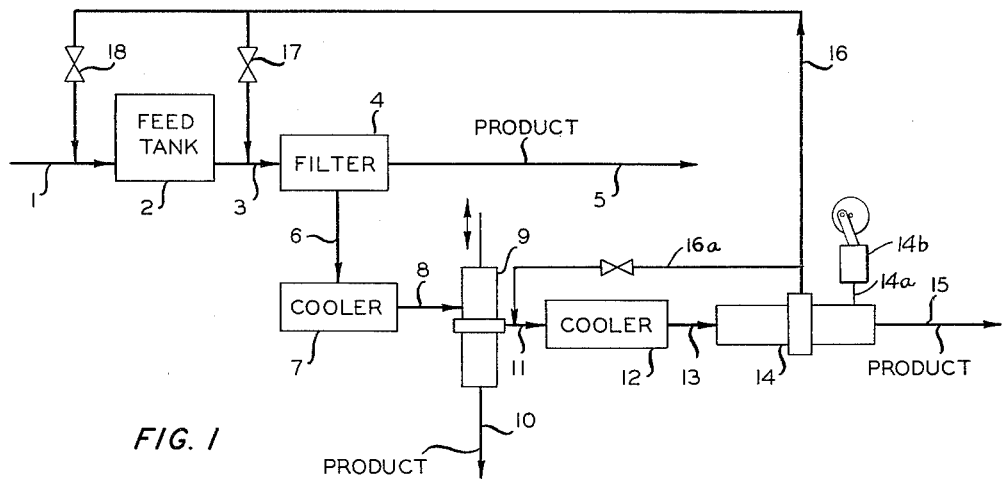

Aug. 28, 1962     S. J. MARWIL     3,050,952

SEPARATION BY CRYSTALLIZATION

Filed Oct. 5, 1960

INVENTOR.
S. J. MARWIL
BY Hudson & Young

ATTORNEYS

United States Patent Office 3,050,952
Patented Aug. 28, 1962

3,050,952
SEPARATION BY CRYSTALLIZATION
Stanley J. Marwil, Bartlesville, Okla., assignor to Phillips
Petroleum Company, a corporation of Delaware
Filed Oct. 5, 1960, Ser. No. 60,634
10 Claims. (Cl. 62—58)

This invention relates to separation by crystallization. In one of its aspects, it relates to a process for separating a plurality of liquids by fractional crystallization. In another aspect, it relates to apparatus suitable for separation of a plurality of liquids by fractional crystallization.

Purification by means of fractional crystallization has been known for a number of years. Schmidt Re. 23,810 (1954) discloses and claims a process and apparatus for purifying crystals, which process involves moving a mixture of crystals and adhering liquid through a liquid removal zone, a reflux zone and a melting zone, removing liquid in said liquid removal zone, melting crystals in said melting zone, withdrawing part of the melt as product and forcing another part of the melt in a direction countercurrent to the movement of crystals in said reflux zone. This process is generally applicable to the separation of at least one pure component from any mixture which is resolvable into its components by fractional crystallization. For example, the process can be used for the concentration of fruit juices, vegetable juices, and other materials which comprise aqueous solutions which can be concentrated by the formation and removal of ice crystals. The process is also of great value in the resolution of non-aqueous mixtures, an example of such an application being the separation of para-xylene from a mixture thereof with the other xylene isomers and ethyl benzene.

More recently, there has been proposed a process and apparatus for effecting a separation of the type described at higher throughput rates, improved stability and ease of operation, and improved heat distribution. In addition, products of high purity are obtainable over long periods of operation. In accordance with this invention, in a process wherein solids are countercurrently contacted with a reflux liquid in a purification zone, the solids in said zone are contacted with an intermittent flow of reflux liquid simultaneously with the propulsion of the solids through said zone. This invention is fully disclosed and claimed in copending U.S. patent application, Serial No. 494,866, filed March 17, 1955, by R. W. Thomas, and the disclosure of this latter application is hereby incorporated by reference into the instant application, now U.S. 2,854,494.

When employing the pulse-type apparatus above-mentioned, difficulties are occasionally encountered in achieving a stable operating condition over a long period of time. One manifestation of the problem is a plugging of the column. This can probably be explained in the following manner: Crystal size of the component frozen out increases with increasing concentration of that component in the feed. The filtration rates are such that it is very easy to remove too much mother liquor in the filter section of the pulse column. This leaves the bed too dry in this section of the column and makes it extremely difficult to move (by pulse pressure) to the purification section. The band of stable operation is so narrow that it is not possible to control the exact amount of filtration and still leave the bed fluid enough to be pulsed into the purification section; thus, the bed hangs in the upper section of the column. Since the bed will not move to the heat, the heat travels upward to the bed. This results in operation of the purification section at elevated temperature and leads to channeling. Also, with higher purity feedstocks, the crystals leave the chiller at a warmer temperature to produce the same amount of solids than at a lower level of component to be frozen. This means that there is a lower amount of refreezing at the product end of the column and hence more voids in the bed. (The refreezing ratio is defined as the pounds of product frozen at the product end of the column required to furnish sufficient heat to raise one pound of solids in the slurry from the chiller outlet temperature to the melting point of the product.) The lower amount of refreezing leaving voids in the bed has three effects; (1) a net loss of pulse energy available for refluxing the bed, (2) less energy available for moving bed from filter section to heater and (3) a chance for mother liquor to channel through to the product end of the column.

I have now discovered that these problems can be remedied by maintaining the concentration in the feed of the component to be frozen below a predetermined maximum. This is in sharp contrast to the usual concept of crystal purification, viz. that a higher concentration in the feed of product to be frozen will lead to greater product purity at a given throughput or to greater throughput at a given product purity. Indeed, this seems to be true in a piston-type apparatus. For example, at peak rates, an 8-inch diameter piston column will produce 36 gallons per hour of 98.0% para-xylene from a 60 percent para-xylene feedstock. With a 75 percent para-xylene feedstock, the same column will produce 64 gallons per hour of 98.0% para-xylene. Capacity of an 8-inch diameter pulsed column increasees from 48 to 63 gallons per hour with the above-mentioned increase in feedstock para-xylene content. However, column stability becomes greatly impaired to the extent that the column is incapable of sustained operation with the higher purity feedstock.

I have discovered further that this maximum differs from one system of components to another.

It is an object of this invention to provide a method for fractionally separating a plurality of liquids by crystallization. Another object of this invention is to provide for fractional crystallization of liquids with improved stability of operation. A further object of the invention is to provide an improved apparatus suitable for fractional crystallization of a liquid mixture. Still another object of the invention is to provide improved process and apparatus for fractionally separating a liquid mixture using a pulsed column apparatus.

Other aspects, objects and the several advantages of this invention will be apparent from a study of this disclosure, drawing, and the appended claims.

According to my invention, a pulse-type crystallization column is operated with a predetermined maximum concentration of component to be frozen in its feed. This can be accomplished in several manners. In one presently preferred mode of operation, any necessary dilution of the feed is accomplished by recycling the mother liquor from the pulse column to its feed. In one embodiment of my invention, a multi-component liquid system is cooled to cause partial freezing. After phase separation, which can be effected by filtration, centrifugation, or other suitable means, the resulting crystals are melted and then cooled to form another slurry of crystals. This slurry is treated in a piston-type column. The mother liquor from this column is used as feed to a pulsed column, with pulsed column mother liquor being recycled to the process feed stream if desired. Use of piston column mother liquor as feed to the pulsed column will, in most systems, inherently limit the concentration in the pulsed column feed of component to be frozen to a value below the desired predetermined maximum.

In another embodiment of my invention, a multi-component liquid system is cooled to cause partial freezing and subsequently phase separated as previously. The resulting crystals are melted, divided into two portions and cooled, one portion being treated in a piston-type column, and the other being treated in a pulsed column. Mother liquor from the pulsed column is recycled to the process feed if desired, and mother liquor from the piston-type column is passed to the pulsed column feed in an amount sufficient to maintain the concentration of that stream in component to be frozen below the predetermined maximum.

Figure 2:
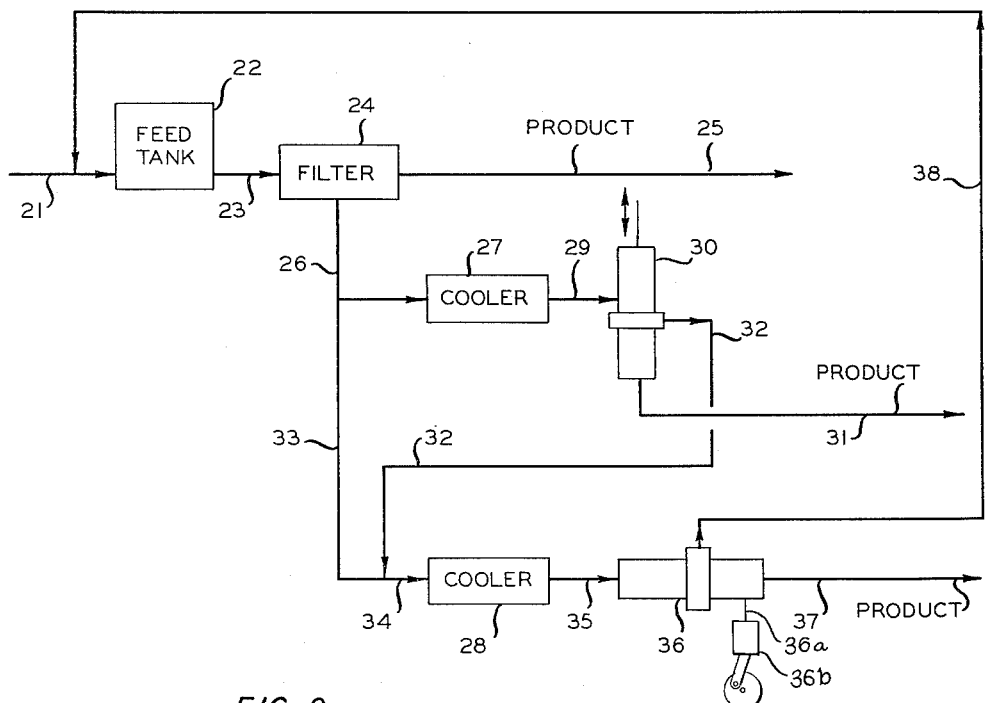

In the drawings, FIGURE 1 shows an embodiment wherein a piston column and a pulsed column are operated in series. FIGURE 2 shows an embodiment wherein a piston column and a pulsed column are operated in parallel.

Referring now to FIGURE 1, the operation will be described as applied to separation of methyl vinyl pyridine (MVP) frim a mixture containing it and methyl ethyl pyridine (MEP). The mixture of MVP and MEP is fed by way of line 1 to a feed surge tank 2 and thence by way of line 3 through a cooling means (not shown) to a filter 4. Cooling the stream results in freezing a portion of the MVP; and the mother liquor is removed from the filter by way of line 5 to further utility. This mother liquor is lower in MVP concentration than the filter feed. Crystals from filter 4 are passed by way of line 6 to cooler 7 wherein they are further cooled. These crystals have preferably been remelted in line 6 before being cooled. The cooled slurry effluent from cooler 7 is then passed by way of line 8 to piston column 9, wherein the crystal mass is forced toward a heated end of column 9 in communication with product line 10. Internally supplied heat in this end of the column causes a melting of the crystals; a portion of this melt is withdrawn as an MVP-enriched product by way of line 10. Another portion of this melt is displaced back through the column by the advancing crystal mass, and serves to reflux the crystal mass, washing occluded MEP from the MVP crystals. The resulting liquid stream, poorer than the column feed in MVP, leaves column 9 by way of a wall filter through line 11. This stream is cooled in cooler 12, again resulting a slurry of MVP crystals in an MVP-MEP mother liquor, which is passed by way of line 13 to pulsed column 14. Pressure pulses can be supplied to column 14 by such as conduit 14a in communication with a reciprocating piston pulsing means 14b. Again, internal heat is furnished to the product end of column 14 adjacent the end in communication with product line 15. The crystal mass is advanced through the column, and the crystals melted by this heat. A portion of the melt is withdrawn as an MVP-enriched product by way of line 15, and another portion displaced by the advancing crystal mass. This displaced portion serves to reflux the crystals and is then withdrawn through a wall filter by means of line 16. This mother liquor is poorer in MVP content than the feed to column 14, and may be returned for further processing by way of line 16 and valves 17 or 18 to the feed stream. Alternately, all or a portion of this mother liquor can be returned by way of conduit 16a and its associated valve to the pulse column feed in conduit 11 so as to maintain its desired purity. Use of mother liquor from piston column 9 or pulsed column 14 as feed to pulsed column 14 serves to restrict the MVP content in the pulsed column feed. It has been found that in this system, i.e., MVP-MEP, the maximum MVP concentration in the pulsed column feed should not be greater than about 75 percent.

Referring now to FIGURE 2, the operation will be described as applied to separation of p-xylene from a mixture containing it in admixture with o-xylene, m-xylene, and ethyl benzene. This mixture is fed by means of line 21 to feed surge tank 22 and thence by way of line 23 through a cooling means (not shown) to a filter 24. Cooling the stream results in freezing a portion of the p-xylene. The mother liquor is withdrawn by way of line 25 to further utility. This mother liquor is lower in p-xylene concentration than the filter feed. Crystals from filter 24 are passed by way of lines 26, 33 and 34 to coolers 27 and 28 wherein they are further cooled. These crystals have preferably been remelted in line 26 before being cooled. The cooled slurry effluent from cooler 27 is passed by way of line 29 to piston column 30. A p-xylene enriched product is withdrawn by way of line 31. Mother liquor, poorer in p-xylene than column feed, is passed by way of line 32 to line 33. This combined stream then passes by way of line 34 to cooler 28 and the resulting slurry is passed by way of line 35 to pulsed column 36. Pressure pulses can be supplied to column 36 by such as conduit 36a in communication with a reciprocating piston pulsing means 36b. Product, enriched in p-xylene, is withdrawn by way of line 37 and mother liquor may be recycled by way of line 38 for further processing. It has been found that in this system, i.e., p-xylene with o- and m-xylene and ethyl benzene, that the pulsed column feed should not contain more than about 65% p-xylene. Thus, in this operation, sufficient mother liquor from piston column 30 is added by way of line 32 to pulsed column feed in line 34 to maintain the concentration of p-xylene in the total feed stream below about 65%.

The invention will be further illustrated by means of the following tables showing flow rates, concentrations, and temperatures prevailing in the operation of the systems shown in the two figures.

TABLE I (FIGURE 1)

| Line No. | 1 | 3 | 5 | 8 | 10 | 13 | 15 | 16 |
|---|---|---|---|---|---|---|---|---|
| MVP Conc., Wt. Percent | 50.7 | 51.2 | 42.5 | 85.0 | 95.0 | 75.0 | 95.0 | 58.4 |
| Total Flow, g.p.h | 1,783.4 | 1,890 | 1,500 | 390 | 195 | 195 | 88.4 | 106.6 |
| Temp., °F | | −57 | −57 | −15 | 50 | −36 | 35 | −36 |

TABLE II (FIGURE 2)

| Line No. | 21 | 23 | 25 | 26 | 29 | 31 | 32 | 33 | 35 | 37 | 38 |
|---|---|---|---|---|---|---|---|---|---|---|---|
| p-xylene conc., wt. percent | 28.0 | 28.0 | 12.57 | 72.0 | 72.0 | 98.0 | 52.5 | 72.0 | 57.0 | 98.0 | 28.0 |
| Total flow, g.p.h | 1,172 | 1,300 | 962 | 338 | 284 | 120 | 164 | 54 | 218 | 90 | 128 |
| Temp., °F | | −73 | −73 | | 12 | | | | −25 | | |
| Percent solids | | 18.7 | | | 40 | | | | 40 | | |

Although the examples show purification of MVP and p-xylene, the process and apparatus of this invention are applicable to a vast number of simple binary and complex multi-component systems. The invention is particularly applicable to the separation of hydrocarbons which have practically the same boiling points and are, therefore, difficult to separate by distillation. Where high boiling organic compounds are concerned, separation by distillation is often undesirable because many such compounds are unstable at high temperatures. One particularly advantageous application of the process lies in the purification of a component of, for example, 15 to 25 percent purity so as to effect a purity of 98 percent or higher. In order to illustrate some of the systems to which the invention is applicable, the following compounds are grouped with respect to their boiling points:

| Group A | B.P., °C. | F.P., °C. |
|---|---|---|
| Benzene | 80 | 5.5 |
| n-Hexane | 69 | −94 |
| n-Heptane | 98.52 | −90.5 |
| Carbon Tetrachloride | 77 | −22.8 |
| Acrylonitrile | 79 | −82 |
| Ethyl Alcohol | 78.5 | −117.3 |
| 2,2-Dimethylpentane | 79 | −125 |
| 2,3-Dimethylpentane | 86 | |
| Methyl ethyl ketone | 79.6 | −86.4 |
| Methylpropionate | 79.9 | −87.5 |
| Methyl acrylate | 80.5 | |
| 1,3-Cyclohexadiene | 80.5 | −98 |
| 2,4-Dimethylpentane | 80.8 | −123.4 |
| 2,2,3-Trimethylbutane | 80.9 | −25 |
| Cyclohexane | 81.4 | 6.5 |
| Acetonitrile | 82 | −42 |
| Cyclohexene | 83 | −103.7 |
| 2-Methylhexane | 90 | −119 |
| 3-Methylhexane | 89.4 | −119.4 |

| Group B | B.P., °C. | F.P., °C. |
|---|---|---|
| Methyl cyclohexane | 100.3 | −126.3 |
| Cyclohexane | 81.4 | 6.5 |
| n-Heptane | 98.52 | −90.5 |
| 2,2,4-Trimethylpentane (isooctane) | 99.3 | −107.4 |
| Nitromethane | 101 | −29 |
| p-Dioxane | 101.5 | 11.7 |
| 2-Pentanone | 101.7 | −77.8 |
| 2-Methyl-2-butanol | 101.8 | −11.9 |
| 2,3-Dimethylpentane | 89.4 | |
| 3-Ethylpentane | 93.3 | −94.5 |

| Group C | B.P., °C. | F.P., °C. |
|---|---|---|
| Toluene | 110.8 | −95 |
| Methylcyclohexane | 100.3 | −126.3 |
| 2,2,3-Tetramethyl butane | 106.8 | 104 |
| 2,5-Dimethylhexane | 108.25 | −91 |
| 2,4-Dimethylhexane | 110 | |
| 2,3-Dimethylhexane | 113.9 | |
| 3,4-Dimethylhexane | 116.5 | |
| 3-Ethyl-2-methylpentane | 114 | |
| 3-Ethyl-3-methylpentane | 119 | |

| Group D | B.P., °C. | F.P., °C. |
|---|---|---|
| Aniline | 184.4 | −6.2 |
| Toluene | 110.8 | −95 |
| Benzene | 80.0 | 5.5 |

| Group E | B.P., °C. | F.P., °C. |
|---|---|---|
| Carbon Tetrachloride | 77 | −22.8 |
| Chloroform | 61 | −63.5 |
| $CS_2$ | 46.3 | −108.6 |
| Acetone | 56.5 | −95 |

| Group F | B.P., °C. | F.P., °C. |
|---|---|---|
| Ortho-xylene | 144 | −27.1 |
| Meta-xylene | 138.8 | −47.4 |
| Para-xylene | 138.5 | 13.2 |

| Group G | B.P., °C. | F.P., °C. |
|---|---|---|
| Ortho-cymene | 175.0 | −73.5 |
| Meta-cymene | 175.7 | <−25 |
| Para-cymene | 176.0 | −73.5 |

| Group H | B.P., °C. | M.P., °C. |
|---|---|---|
| Dimethyl phthalate | 282 | 5.5 |
| Dimethyl isophthalate | 124 (12 mm.) | 67 |
| Dimethyl terephthalate | 288 | 140.6 |

| Group I | B.P., °C. | M.P., °C. |
|---|---|---|
| Ortho-nitrotoluene | 222.3 | $\alpha$ −10.6, $\beta$ −4.1 |
| Meta-nitrotoluene | 231 | 15.5 |
| Para-nitrotoluene | 238 | 51.3 |

Mixtures consisting of any combination of two or more of the components within any one of the groups can be resolved by the process of the invention, as can mixtures made up of components selected from different groups; for example, benzene can be separated from a benzene-n-hexane or a benzene-n-heptane mixture in which the benzene is present in an amount greater than the eutectic concentration. In the same manner, para-xylene can be readily separated from a mixture of para- and meta-xylenes or from para-, meta-, or ortho-xylenes. Benzene can also be separated from a mixture thereof with toluene and/or aniline. Multi-component mixtures which can be effectively resolved so as to recover one or more of the components in substantially pure form include mixtures of at least two of 2,2-dimethylpentane, 2,4-dimethylpentane, 2,2,3-trimethylbutane, methyl cyclohexane, 2,2,4-trimethylpentane, and mixtures of at least two of carbon tetrachloride, chloroform, and acetone. The invention is also applicable to the separation of individual components from a system of cymenes.

This invention can also be utilized to purify naphthalene, hydroquinone, (1,4-benzenediol), paracresol, para-dichlorobenzene, and such materials as high melting waxes, fatty acids, and high molecular weight normal paraffins. The invention can also be used to resolve a mixture comprising anthracene, phenanthrene, and carbazole. Furthermore, the invention can be used to separate durene (1,2,4,5-tetramethylbenzene) from $C_{10}$ aromatics. In cases where the material to be purified has a relatively high crystallization point, the impure material is raised to a temperature at which only a portion of the mixture is in a crystalline state, and the resulting slurry is handled at such a temperature that operation is as described in connection with materials which crystallize at lower temperatures.

It is not intended, however, to limit the invention to organic mixtures, but rather it is applicable to inorganic mixtures as well, and offers a practical method of separating two inorganic components between which solvates or hydrates are formed. Examples of inorganic systems to which this invention is applicable are those for the recovery of pure salts, such as ammonium nitrate, and of anhydrous salts from their hydrates.

In certain cases, it is also desirable to recover mother liquor separated from the crystals as a product of the process. This situation arises where it is desired to increase the concentration of a dilute solution. This aspect of the invention is especially applicable to the production of concentrated food products which involves primarily the removal of water from these products. Accordingly, by utilizing the process of this invention, water can be removed from fruit juices such as grape, orange, lemon, pineapple, apple, tomato, etc. It is also possible to concentrate vegetable juices and beverages such as milk, beer, wine, coffee or tea by this method.

Although the figures illustrate two methods of maintaining pulsed column feed concentration below the desired maximum, it will be obvious to one skilled in the art that the same desideratum can be obtained by other methods. For example, if one is separating MVP from MEP in a pulsed column, an extraneous stream poorer in MVP than the feed could be added to the feed in an amount sufficient to maintain the overall concentration of MVP in the feed below the desired maximum, i.e., here about 75 weight percent. Further, in a staged operation as in FIGURE 1, process feed or filtrate from e.g. filter 4 might be used to dilute the pulse column feed.

Although I have given values for the maximum feed concentration desirable of MVP in an MVP-MEP system, and of p-xylene in a mixed xylene-ethyl benzene system for a pulsed column, it will be obvious to one skilled in the art in possession of this disclosure that the maximum feed concentration of any given component to be frozen and subsequently separated in a pulsed column can be determined by routine testing of the given system. Although I do not wish to be limited thereto, it is my theory that, because larger crystals are formed with a feedstock of greater purity, refluxing of the advancing crystal mass in the pulsed column by melted crystals is allowed to occur at a greater rate than desirable when feedstocks of too high a purity are processed. Thus, the reflux melt, which is of necessity hotter than the crystal melt, can cause channels through the crystal mass, which decreases the contacting efficiency between the reflux and the crystals. Further, it is felt that the larger crystals formed from high purity feedstocks may have more impurities occluded therein. In any event, I have found that pulsed column operational stability can be improved by maintaining the concentration of component to be frozen below a predetermined maximum.

Reasonable modification and variation are possible within the scope of the foregoing disclosure, the drawings, and the appended claims to the invention, the essence of which is that a pulsed crystal purification column can be operated at a more stable state and with greater throughput and/or product purity by maintaining the concentration in the feed of component to be frozen below a predetermined maximum.

I claim:

1. A process for separation of a liquid mixture comprising passing said mixture to a cooling zone, cooling said mixture to cause a portion of at least one of its components to freeze, separating the frozen portion from the residue, withdrawing said residue as a product of the process, introducing said frozen portion as feed to a piston-type purification column, withdrawing a melt stream from a heated portion of said column as a second product of the process, withdrawing a mother liquor stream from said column, passing said mother liquor stream as feed to a second cooling zone, cooling said stream to cause at least a portion of one of its components to freeze, passing said stream as feed to a pulse-type purification column, withdrawing a melt stream from a heated portion of said column as a third product of the process, withdrawing a mother liquor stream from said column, and returning a portion of said mother liquor stream to said liquid mixture in an amount sufficient to maintain concentration of said frozen portion component in said liquid mixture below a predetermined minimum.

2. Apparatus for separation of a liquid mixture comprising first cooling means, first separation means, conduit means communicating between said first cooling means and said first separation means, piston-actuated crystal purification means comprising an elongated vessel having heating means at one end thereof, filter means near a central portion thereof, and piston means at the other end thereof, said piston means being adapted to cyclically urge a mass of solids through said elongated vessel, said filter means having associated therewith a first conduit adapted to withdraw liquid from said vessel, said vessel having a second and a third conduit means communicating with said other end and said one end of said vessel, respectively, and adapted for fluid inlet to and withdrawal from said vessel, respectively, conduit means communicating between said first separating means and said second conduit means, second cooling means, conduit means communicating between said first conduit and said second cooling means, pulse-actuated crystal purification means comprising an elongated vessel having heating means at one end thereof, filter means near a central portion thereof, and pulsing means in communication therewith, said pulsing means being adapted to rapidly vary the pressure cyclically in another end of said elongated vessel, said filter means having associated therewith a fourth conduit adapted to withdraw liquid from said vessel, said vessel having a fifth and a sixth conduit means communicating with said other end and said one end of said vessel, respectively, and adapted for fluid inlet to and withdrawal from said vessel, respectively, conduit means communicating between said second cooling means and said fifth conduit means, and conduit means communicating between said fourth conduit and said first cooling means.

3. In the process for separation of a liquid mixture wherein said mixture is cooled to partially solidify at least one component of said mixture and the resulting cooled mixture is introduced without further change in composition into a purification zone wherein at least a portion of the solidified component is melted and a portion of the resulting melt countercurrently contacted with said cooled mixture by periodic application of pressure pulses to the liquid in said purification zone and then subsequently withdrawn from said purification zone as mother liquor, the improvement comprising passing at least a portion of said withdrawal mother liquor melt into said liquid mixture at such a point that the composition of the mixed stream produced by said step of passing remains constant until its introduction into said purification zone.

4. The process for recovery of p-xylene from a liquid feed stream comprising xylene isomers and ethyl benzene comprising passing said liquid feed stream to a first cooling zone, cooling said stream therein to cause at least a portion of the p-xylene contained therein to freeze, passing said stream to a first separation zone, separating therein the liquid from the solid phase, withdrawing from said zone as a product of the process said liquid phase, withdrawing from said zone said solid phase, passing said withdrawn solid phase to a piston-actuated crystal purification zone, melting at least a portion of said solid phase within said piston-actuated crystal purification zone, withdrawing from said last-mentioned zone at least a portion of said melted phase as a p-xylene enriched product of the process, withdrawing from said last-mentioned zone a second liquid stream, passing said second liquid stream to a second cooling zone, cooling said second liquid stream therein to cause another portion of the p-xylene contained therein to freeze, passing said second liquid stream now containing solids to a pulse-actuated purification zone, melting at least a portion of said last-mentioned solids therein, withdrawing said melted solids therefrom as a p-xylene enriched product of the process, withdrawing a liquid stream reduced in p-xylene therefrom, and passing a portion of said p-xylene reduced stream to said liquid feed stream in an amount sufficient to maintain the p-xylene content of the said second liquid stream below a predetermined amount.

5. The process of claim 4 wherein said predetermined amount is about 65%.

6. The process for recovery of methylvinylpyridine from a liquid feed stream comprising methylvinylpyridine and methylethylpyridine comprising passing said liquid feed stream to a first cooling zone, cooling said stream therein to cause at least a portion of the methylvinylpyridine contained therein to freeze, passing said stream to a first separation zone, separating therein the liquid from the solid phase, withdrawing from said zone as a product of the process said liquid phase, withdrawing from said zone said solid phase, passing said withdrawn solid phase to a piston-actuated crystal purification zone, melting at least a portion of said solid phase within said piston-actuated crystal purification zone, withdrawing from said last-mentioned zone at least a portion of said melted phase as a methylvinylpyridine enriched product of the process, withdrawing from said last-mentioned zone a second liquid stream, passing said second liquid stream to a second cooling zone, cooling said second liquid stream therein to cause another portion of the methylvinylpyridine contained therein to freeze, passing said second liquid stream now containing solids to a pulse-actuated purification zone, melting at least a portion of said last-mentioned solids therein, withdrawing said melted solids therefrom as a methylvinylpyridine enriched product of the process, withdrawing a liquid stream reduced in methylvinylpyridine therefrom, and passing a portion of said methylvinylpyridine reduced stream to said liquid feed stream in an amount sufficient to maintain the methylvinylpyridine content of the said second liquid stream below a predetermined amount.

7. The process of claim 6 wherein said predetermined amount is about 75%.

8. A process for separation of a liquid mixture comprising passing said mixture to a first cooling zone, cooling said mixture therein to cause a portion of at least one of its components to freeze, separating the frozen portion from the residue, withdrawing said residue as a first product of the process, withdrawing said frozen portion, dividing said frozen portion into a plurality of streams having essentially the same composition, passing a first of said plurality of streams through a second cooling zone wherein said first stream is cooled sufficient to cause additional freezing, then passing said first stream to a pulse-type purification zone, withdrawing a melt stream from said pulse-type zone as a second product of the process, passing a second of said plurality of streams through a third cooling zone wherein said second stream is cooled sufficient to cause additional freezing, then passing said second stream to a piston-type purification zone, withdrawing a melt stream from said piston-type zone as a third product of the process, withdrawing a mother liquor stream from said piston-type zone, and returning at least a portion of said mother liquor stream to said first of said plurality of streams upstream of said piston-type zone in an amount sufficient to cause the composition of the frozen component in the resulting mixed stream to remain below a predetermined maximum.

9. The process of claim 8 wherein said liquid mixture comprises isomeric xylenes including p-xylene, said first product of said process has a p-xylene concentration less than said liquid mixture, said second and third products of said process have a p-xylene concentration greater than said liquid mixture, and said predetermined maximum is about 65%.

10. The process of claim 8 wherein said liquid mixture comprises methyl ethyl pyridine and methyl vinyl pyridine, said first product of said process has a methyl vinyl pyridine concentration less than said liquid mixture, said second and third products of said process have a methyl vinyl pyridine concentration greater than said liquid mixture, and said predetermined maximum is about 75%.

References Cited in the file of this patent

UNITED STATES PATENTS

| | | |
|---|---|---|
| 2,815,288 | McKay | Dec. 3, 1957 |
| 2,854,494 | Thomas | Sept. 30, 1958 |
| 2,913,344 | Stallings | Nov. 17, 1959 |
| 2,940,272 | Croley | June 14, 1960 |
| 2,957,773 | Toulmin | Oct. 25, 1960 |